United States Patent

[11] 3,526,171

| [72] | Inventor | Charles M. Barnes |
| | | St. Joseph, Michigan |
| [21] | Appl. No. | 759,935 |
| [22] | Filed | Sept. 16, 1968 |
| [45] | Patented | Sept. 1, 1970 |
| [73] | Assignee | The Bendix Corporation |
| | | a corporation of Delaware |

[54] ROLLING DIAPHRAGM REINFORCEMENT
2 Claims, 2 Drawing Figs.

[52] U.S. Cl............................................ 92/98,
74/18.2, 92/99, 188/152.873
[51] Int. Cl........................................... F01b 19/02,
F16j 3/00, F16j 15/52
[50] Field of Search........................................... 92/100, 98,
98RD, 99; 60/546M; 188/100S, 152.873; 74/18.1,
18, 18.2

[56] References Cited
UNITED STATES PATENTS

| 1,702,056 | 2/1929 | Murray | 74/18.1X |
| 2,317,073 | 4/1943 | Martin | 92/98 |
| 2,721,579 | 10/1955 | Sexton | 74/18.2X |
| 2,781,784 | 2/1957 | Baker | 92/98 |
| 2,914,089 | 11/1959 | Allinquant | 92/98X |
| 3,185,041 | 5/1965 | Stein | 92/98X |
| 3,224,345 | 12/1965 | Doetsch | 92/99X |

*Primary Examiner*—Martin P. Schwadron
*Assistant Examiner*—Leslie J. Payne
*Attorneys*—Richard G. Geib, Plante, Arens, Hartz and O'Brien

ABSTRACT: A tear-drop ring confined by a diaphragm folded thereover and therethrough to support rolling action such that it is equal all around said ring.

Patented Sept. 1, 1970

3,526,171

INVENTOR.
CHARLES M. BARNES
BY
Richard G. Geib
ATTORNEY

ROLLING DIAPHRAGM REINFORCEMENT

SUMMARY

Previous attempts to provide rolling diaphragms as seals and piston elements in fluid pressure actuated devices utilizing high pressure have created problems of unequal stressing in the diaphragm, i.e., the high pressure will cause the diaphragm roll to collapse and causing excessive friction and early failure.

It is the principal object of this invention to reinforce a diaphragm of a motor to maintain equal rolling action for the diaphragm whereby its sidewalls are evenly stressed.

DRAWING DESCRIPTION

Other objects and advantages shall be apparent to those skilled in the art from the following description of the drawings in which:

FIG. 1 is a partial cross-sectional view of a disc brake for a vehicle showing an actuator thereof incorporating a diaphragm construction in accordance with this invention; and FIG. 2 is an enlarged partial cross-sectional detail of the disc brake motor of FIG. 1 showing the diaphragm assembly according to the principles of this invention.

DETAILED DESCRIPTION

Figure 1:
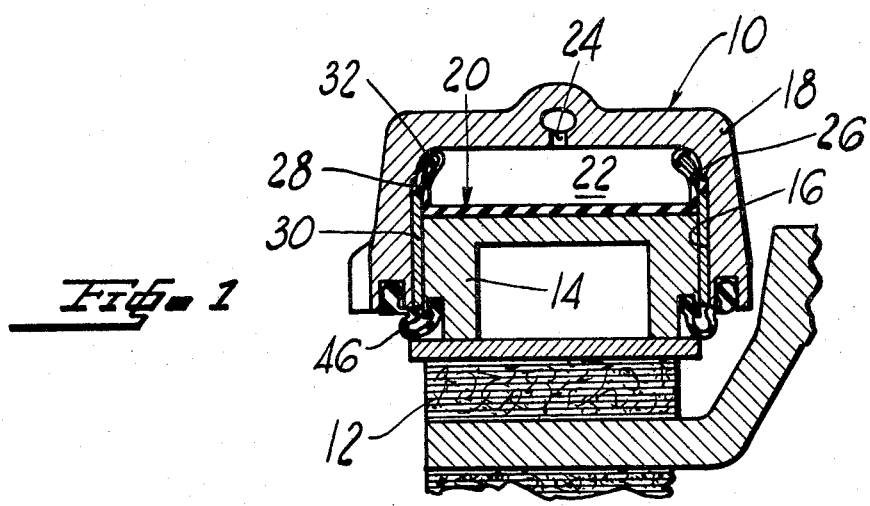
Figure 2:
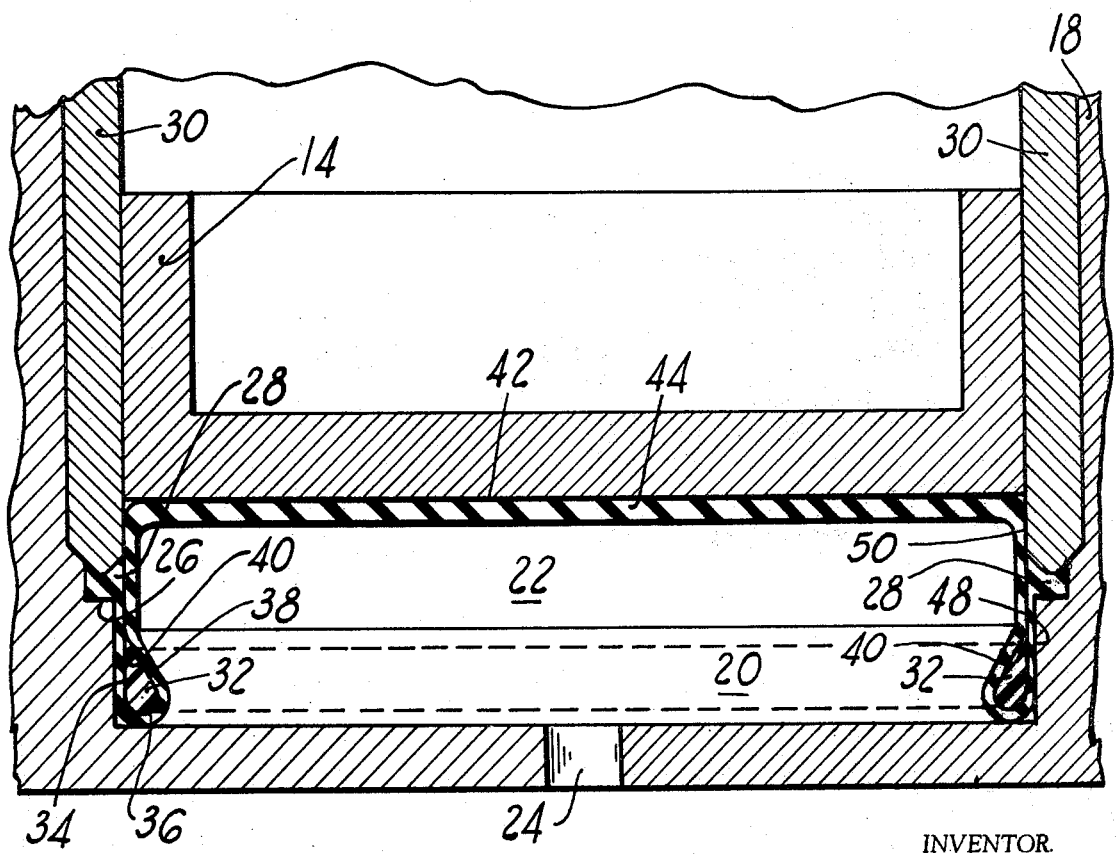

Although this invention has been applied to a motor 10 of a disc brake apparatus 12, it should be readily appreciated that it has significance to any sealed fluid system.

Most hydraulic motors today have pistons, such as a piston 14, which employ O-ring or lip seals in grooves thereof or in the adjacent sidewalls of the bore 16 for a housing 18. These prior art constructions present seal friction forces and this in turn causes seal wear which eventually requires maintenance and/or permits fluid leakage and the introduction of contaminants in the hydraulic system.

Some manufacturers have tried the use of diaphragms, such as diaphragm 20, within the motor to cull a variable volume chamber 22 from the housing bore. However, in these attempts it has been found that pressure introduced to chamber 22, as by a pressure port 24 of the housing 18, causes the collapsing of the roll portion of the diaphragm to hinder rolling and create fold creasing causing local fatiguing.

This invention permits the advantageous use of a diaphragm 20 by constructing the motor to provide a shoulder 26 for bore 16 against which a peripheral bead 28 of the diaphragm 20 is lodged and held by a sleeve 30 inserted and retained to the housing from the open end of bore 16. This completely seals the chamber 22 behind the diaphragm 20.

Next a plastic, preferably polytetrafluorine, ring 32, having a surface 34 parallel to the bore sidewalls connected by a rounded end 36 to a surface 38 converging back to a radiused end 40 connected to surface 34 to be substantially of a teardrop shape, is placed in the bore 16; and diaphragm 20 is pulled through it towards the open end of bore 16. The piston 14 is then slidably mounted within sleeve 30 to have its innermost surface 42 flush on a cross-sectionally thickened central face 44 of diaphragm 20.

The motor assembly is now complete. However, if desired a boot 46 may be snap fitted to piston 14 and housing 18 in grooves thereof to seal the sliding surfaces of sleeve 30 and piston 14 from contamination by foreign particles.

This assembly permits the diaphragm 20 to have an equal rolling action from bore sidewalls 48 to sleeve surfaces 50 when pressure is introduced to chamber 22; and, additionally, the use of higher pressures for chamber 22 than heretofore possible in that the diaphragm walls are completely backed up by the motor structure and the ring 32. Thus, the profile of diaphragm 20 will be maintained during rolling to unfold from 48 to 50 in an axially uniform manner whenever more travel for piston 14 is required than merely the stretching travel permitted in the diaphragm. As the diaphragm unfolds, ring 32 is brought to a new position, and, thus, serves as an automatic take-up device for pad wear in a disc brake application of this invention.

Under normal conditions the stretching action under pressure of the cylindrical section projecting through the ring 32 of diaphragm 20 will permit a slight retraction of the diaphragm when the pressure is released.

It is advisable that during assembly the areas of contact of the diaphragm be suitably lubricated.

I claim:

1. In a fluid motor:
a housing defining a bore therewithin;
a piston slidable in said bore;
a diaphragm interconnecting the wall of the housing and said piston;
said diaphragm having a first axially extending section lying contiguous with the wall of the bore and terminating in a looped section having a rounded portion and a tapered portion, said tapered portion terminating in a second axially extending section of said diaphragm in sliding engagement with said first axially extending section;
a reinforcing ring carried by said diaphragm wholly confined within said looped section; and
said ring having a rounded portion in sliding engagement with the rounded portion of the diaphragm and a tapered portion in sliding engagement with the tapered portion of the diaphragm to thereby prevent collapse of the looped section and to insure uniform rolling of the diaphragm during movement of the piston.

2. The invention of claim 1:
said bore being stepped to define larger and smaller diameter portions presenting a shoulder therebetween;
said first axially extending section having a radially projecting, circumferentially extending bead extending therefrom;
one side of said bead engaging said shoulder; and
a sleeve slidable in said larger diameter portion engaging the other side of said bead for securing the latter to the housing.